March 30, 1965 L. SMITH 3,175,717
VEHICLE BODY SUPPORTING AND CUSHIONING SYSTEM
Filed May 24, 1963 2 Sheets-Sheet 1

INVENTOR.
LAIRD SMITH
BY MAHONEY, MILLER & RAMBO
BY
ATTORNEYS.

March 30, 1965   L. SMITH   3,175,717
VEHICLE BODY SUPPORTING AND CUSHIONING SYSTEM
Filed May 24, 1963   2 Sheets-Sheet 2

INVENTOR.
LAIRD SMITH
BY MAHONEY, MILLER & RAMBO
BY Wm. V. Miller
ATTORNEYS.

3,175,717
VEHICLE BODY SUPPORTING AND CUSHIONING SYSTEM
Laird Smith, 173 S. Park View Ave., Columbus, Ohio
Filed May 24, 1963, Ser. No. 283,068
4 Claims. (Cl. 214—515)

My invention relates to a vehicle body supporting and cushioning system. It has to do, more particularly, with a system for supporting and cushioning a vehicle body on a carrying chassis, whether van type, cargo type, special type, etc., used in transporting sensitive and/or delicate articles.

According to this invention, specially designed and constructed air cells are used between the separate cargo body and the supporting or carrying chassis for minimizing load shock or vibration or both transmitted from the chassis to the cargo body when the air cells are inflated. However, to facilitate loading of the separate cargo body on the vehicle chassis, the air cells are preferably associated with additional supports which receive and support the cargo body during loading and prevent contact of the body with the air cells while they are deflated. When the cells are subsequently inflated, the body is lifted from the additional supports and is supported solely by the inflated cushioning air cells. An important feature of my invention is that the air cells cooperate with locking projections on the cargo body in such a manner that the body is automatically locked to the chassis upon inflation of the cells and is unlocked therefrom upon deflation of the cells. However, even though the body is locked to the chassis, it is free to move relative thereto under control of the cushioning cells in such a manner that the cushioning action is not impeded.

In the accompanying drawings, I have illustrated examples of my invention but it is to be understood that specific details may be varied without departing from basic principles.

Figure 1:
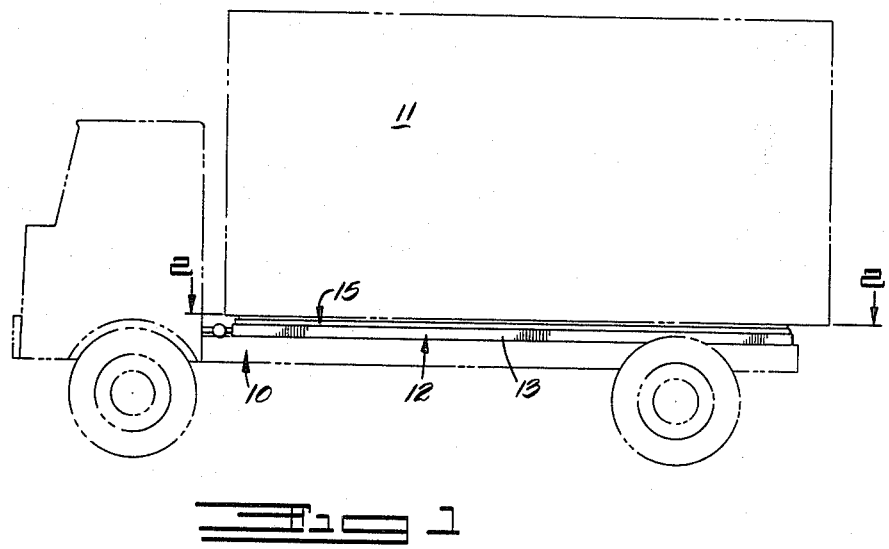
FIGURE 1 is a diagrammatic side elevational view illustrating a truck chassis and associated body to which my invention has been applied.

With reference to the drawings, I have illustrated in FIGURE 1 an example of a vehicle to which my invention may be applied. I have illustrated a truck chassis 10 which carries a cargo body 11 of the van type. Between the chassis and the body, the supporting and cushioning system of this invention is provided and is indicated generally by the numeral 12. It is to be understood, however, that this invention is not limited to the illustrated type of chassis, since it may be a trailer chassis, railroad flat car, etc., nor to the particular type of body, since it may be a platform or stake type, etc.

Figure 5:
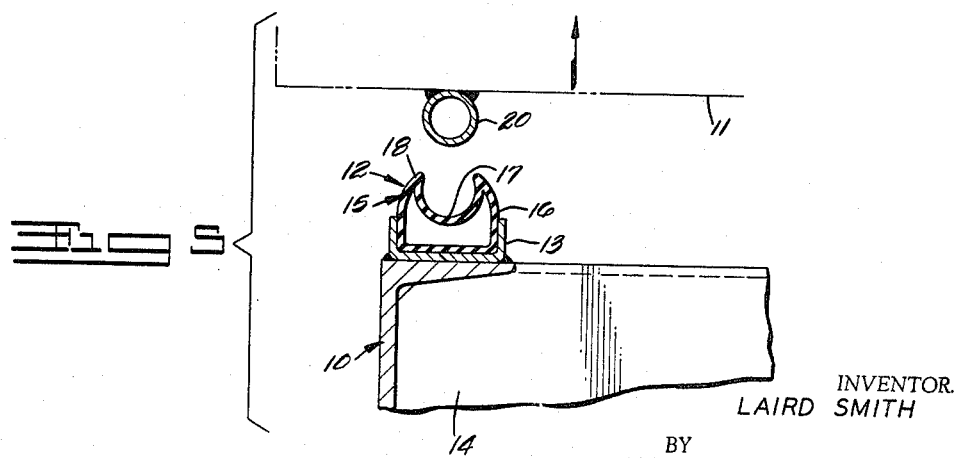
FIGURE 5 is a schematic view illustrating a modification of the system.

The supporting and cushioning system is show as comprising longitudinally extending channels 13 disposed adjacent each side edge of the truck bed 14 and fixed to the upper surface thereof. These channels preferably extend the full length of the bed. Within each channel 13 there is suitably fixed, as by suitable cement or fastening members, an air cell 15 (FIGURE 5) shown as being in the form of a tube of unusual cross section. This tube is of substantially rectangular form at its lower half 16 but its upper half is shaped to provide an upwardly opening groove 17 which is in cross section greater than a semicircle. The portion 16 is integrally joined to the portion 17 in such a manner as to provide the upwardly extending opposed continuous retaining ribs 18. The channel 13 is relatively shallow as compared to the cell 16 and only the lower rectangular part 16 of the cell is within the channel, the upper part including the ribs 18 being disposed above the flanges thereof.

For cooperating with the air cells, the body 11 is provided with the longitudinally extending metal tubes or pipes 20. These two pipes extend the full length of the body and are secured to the lower surface thereof in the same laterally spaced relationship as the channels 13 and associated cells 15 on the bed 14.

Thus, it will be apparent that the body 11 can be suitably positioned over the bed 14 (FIGURE 5) so that the pipes 20 will align with the grooved portions 17 of the air cells. The body can be lowered to position the pipes within the grooves. Then the tubes or cells 15 can be inflated simultaneously by an air connection 19 (FIGURE 2) which may receive compressed air from a suitable supply. If no other support is provided, as in FIGURE 5, the cells 15, before inflation, will flatten out and the body 11 will rest on the upper edges of the flanges of the channels 13 or the pipes 20 will collapse the cells completely and rest on the collapsed cells which are resting on the bottoms of the channels 13. Then if the cells are inflated, the body is lifted from all supports except the cushioning air cells. Furthermore, as the cells are inflated, the retaining ribs 18 are extended firmly over the upper surfaces of the pipes 20 above the centers thereof and will serve to effectively retain the pipes in the groove portions 17 of the cells. Thus, this will prevent displacement of the body 11 vertically, laterally, and longitudinally from the truck chassis 10, even though the body is cushioned from shock and vibration by the cells 15. The pipe 20 and associated air cell groove 17 in effect forms a mortice and tenon arranged in which the tenon (pipe 20) cooperates with an undercut groove.

Figure 2:
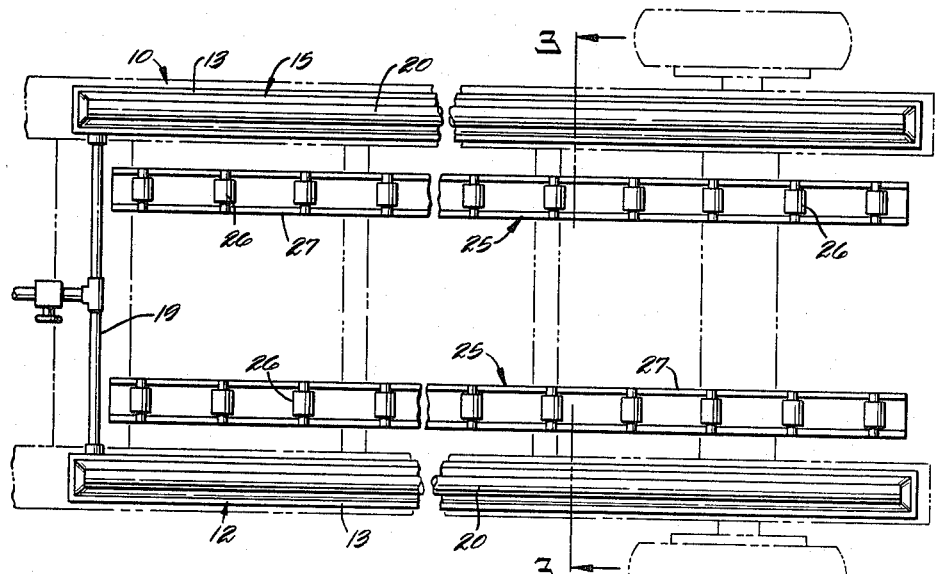
FIGURE 2 is a horizontal sectional view taken along line 2—2 of FIGURE 1 showing my supporting and cushioning system.
Figure 3:
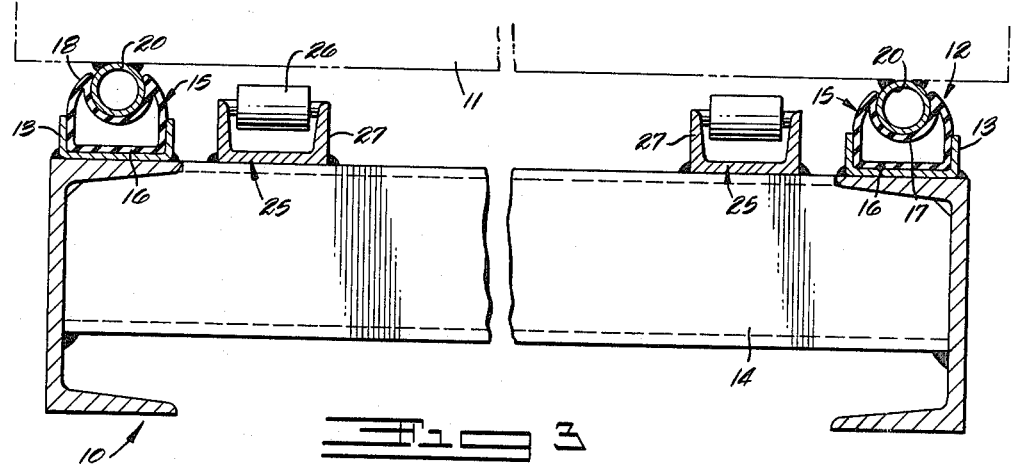
FIGURE 3 is an enlarged transverse section taken along line 3—3 of FIGURE 2, showing the air cells inflated.
Figure 4:
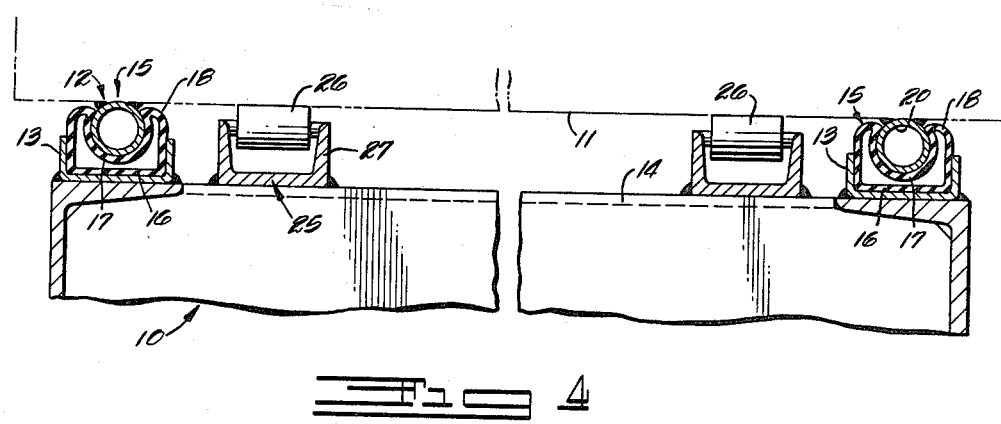
FIGURE 4 is a view similar to FIGURE 3 but showing the air cells deflated.

In addition to the air cell supporting means, other supporting means may be provided as indicated in FIGURES 2, 3 and 4 to facilitate loading and unloading of the body 11 relative to the chassis 10. In this instance, I have shown the supporting units 25 as comprising a series of freely rotatable rollers 26 disposed in channels 27 at longitudinally spaced intervals. The channels 27 are fixed to the bed 14 in laterally spaced relationship adjacent the channels 13. The upper surfaces of these rollers 26 are at a higher level than the upper edges of the channels 13. Therefore, when the body 11 is being loaded on the bed 14, the body may be moved longitudinally onto the bed, the pipes 20 (FIGURE 4) slipping into the grooved portions 17 of the collapsed air cells and the body being supported for use in movement by the rollers 26. When the body reaches its desired position, the cells 15 are inflated. This will lift the body off the rollers 26 (FIGURE 3) because the cells are so designed that they will project above the rollers 26 when inflated. Now the body will be supported solely by the air cells and will be locked thereby to the bed 14 both vertically and longitudinally. However, the yieldable cells still serve as cushioning means even though they do connect the body 11 to the bed 14. To remove the body 11, it is merely necessary to deflate the cells and roll it off the bed without danger of tilting as it is supported by the rollers 26 at each side.

If desired, the relative positions of the tubes 20 and cooperating air cells 15 may be reversed, with the cells carried by the body 11 and having their grooves opening downwardly and cooperating with the pipes 20 on the bed 14.

Thus, it will be apparent that I have provided a simple pneumatic cushioning means between the body and chassis of a vehicle to insulate the body from shock and vibration. The cushioning means is effective to connect the body by a flexible cushioned connection to the chassis. Furthermore, friction-reducing loading means may be used in connection with the deflated cushioning cells and when the cushioning cells are inflated, the body will be supported by the cells independently of the other means.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. In combination, a vehicle chassis member and a body member adapted to be supported thereby, means between the chassis member and the body member for supporting and cushioning the body member from the chassis member, said means comprising flexible air cells between the body member and the chassis member acting as the sole supporting and connecting means between said members when said air cells are inflated, and means for controlling the inflation and deflation of said air cells; said air cells being in the form of inflatable and deflatable tubes, said tubes being so positioned that the body member rests on the tubes when inflated, said tubes being carried by one of said members and each being of a cross section to form a rib-receiving groove therein when deflated, ribs on the other member positioned in the grooves of the tubes, inflation of said tubes causing firm gripping of said ribs in said grooves, said grooves being of undercut cross-sectional form for engaging and retaining the ribs which are tenons having a cross-sectional shape complemental to that of said grooves.

2. The combination of claim 1 in which said ribs are of circular cross section, and said undercut grooves in the cells are arcuate in cross section greater than a semicircle so as to receive said circular cross section ribs and to retain them subsequently when the air cells are inflated.

3. In combination, a vehicle chassis member and a body member adapted to be supported thereby, means between the chassis member and the body member for supporting and cushioning the body member from the chassis member, said means comprising flexible air cells between the body member and the chassis member acting as the sole supporting and connecting means between said members when said air cells are inflated, and means for controlling the inflation and deflation of said air cells; said air cells being in the form of inflatable and deflatable tubes, said tubes being so positioned that the body member rests on the tubes when inflated; and additional supporting means between the body member and the chassis member, said additional supporting means comprising a unit on one member projecting toward the other member a lesser extent than the projection of said tubes when inflated, said unit engaging and supporting the body member for relative longitudinal movement on the chassis member when said tubes are deflated.

4. The combination of claim 3 in which said unit includes antifriction rollers carried by one of said members and engaging the other to facilitate loading and unloading of the body member relative to the vehicle chassis member.

References Cited by the Examiner

UNITED STATES PATENTS

| 1,811,923 | 6/31 | Flintermann | 296—35 X |
| 2,469,131 | 5/49 | Ross | 296—44 |
| 2,589,678 | 3/52 | De Lay | 280—80 |

FOREIGN PATENTS

| 8,477 | 1907 | Great Britain. |
| 503,349 | 5/54 | Canada. |

A. HARRY LEVY, *Primary Examiner.*